3,694,343
SEPARATING LIGHT GASES FROM A HYDROCONVERSION PRODUCT

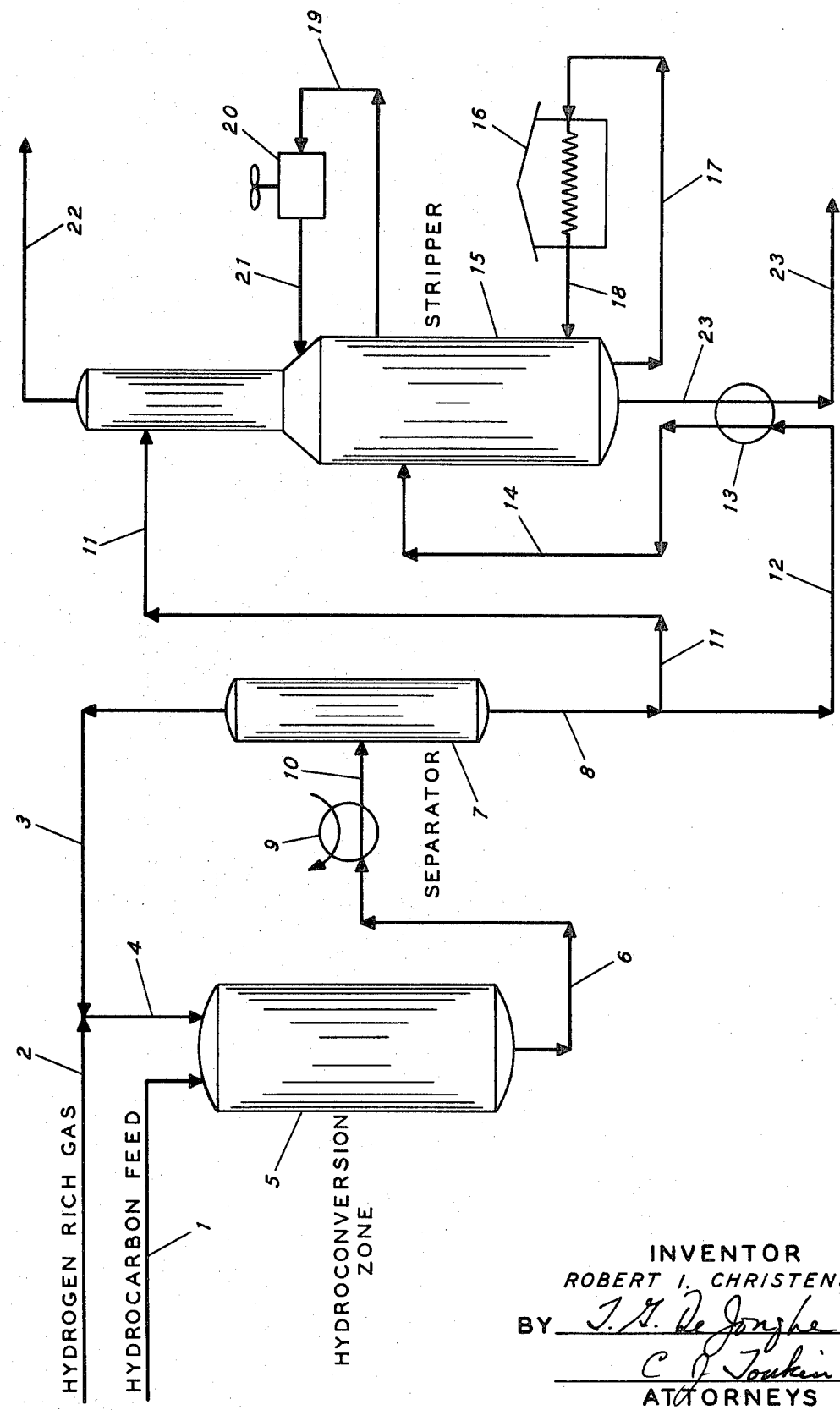

Robert I. Christensen, San Rafael, Calif., assignor to Chevron Research Company, San Francisco, Calif.
Filed Aug. 20, 1970, Ser. No. 65,570
Int. Cl. C10g 7/00
U.S. Cl. 208—100                                11 Claims

ABSTRACT OF THE DISCLOSURE

A process for separating light gases from heavier hydrocarbons which comprises: (a) feeding a first portion of a mixture of the light gases and heavier hydrocarbons at a first temperature to a fractionation column near a midpoint along the length of the column, (b) applying heat to the material in the column near the bottom of the column, (c) feeding a relatively cold second portion of the mixture, having a temperature at least 50° F. below the first temperature, to the column near the top of the column, (d) withdrawing a pumparound stream from an upper portion of the column, cooling the pumparound stream and then returning it to the column, with the withdrawal and return of the pumparound stream being located between the point at which the first and second mixtures are fed to the column, (e) withdrawing light gases from the top of the column, and (f) withdrawing heavier hydrocarbons from the bottom of the column. It is particularly preferred to employ the distillation process in combination with jet fuel hydrogenation.

BACKGROUND OF THE INVENTION

The present invention relates to the separation of mixtures by a stripping or a fractionation process. More particularly, the present invention relates to removing light gases from a mixture comprising at least light gases and relatively heavy hydrocarbons. The present invention also relates to distillation of effluents from hydroconversion processes, particularly hydrogenation and desufurization processes.

In the past, various distillation methods have been employed to effect separation of components in a feed mixture. The distillation is typically carried out in a column or a tower containing contacting means such as sieve trays, bubble cap trays or packing. Distillation columns are well known in the art. In the most conventional of the known distillation methods, the feed mixture, which may or may not be preheated, is introduced into a distillation zone and the feed is segregated with the lower boiling constituent tending to concentrate as it travels upwardly in the distillation zone while the higher boiling constituent concentrates as it flows downwardly in the distillation zone. The heavier boiling constituents form the bottoms of the distillation zone. A portion of the bottoms is heated in a reboiler zone, generally a shell and tube heat exchanger or a furnace wherein the bottoms flow inside the heat exchange tubes. The choice of reboiler will be dependent upon the heat requirements of the system. The vapor from the reboiler zone is recycled to the distillation zone. The other portion of bottoms is withdrawn as product. The overhead from the distillation zone is directed to a condenser and a portion of the condensed product refluxed to the top of the tower. The remainder of the condensed overhead is withdrawn as overhead product.

In some instances, distillation processes will employ what is commonly called a pumparound loop in combination with the distillation column. The pumparound loop is most commonly used in crude oil distillation as is indicated, for example, in USP 3,296,121. As is indicated above, in most of the distillation methods the bottoms from the distillation column are reboiled, thus adding heat to the material near the bottom of the column, and the overhead from the column is condensed, with cool condensate being refluxed to the top of the distillation column, thus removing heat near the upper part of the distillation column. Thus, in conventional distillation columns, heat is added near the bottom of the distillation column and heat is removed near the top of the distillation column. When a pumparound loop is used at some position along the length of the column, the pumparound accomplishes heat removal so as to lessen the amount of heat removal which needs to be accomplished by the overhead condensing system. The pumparound loop typically operates by withdrawing a sidestream from the distillation column, cooling the sidestream and then returning the sidestream or pumparound stream to the column at a position only slightly above that position from which the pumparound was withdrawn from the distillation column.

The present invention is particularly concerned with distillation of mixtures containing light gases and the present invention is particularly preferably applied to the separation of light gases from mixtures containing heavier hydrocarbons but with only a relatively small amount of material boiling between or having a volatility between the volatility of the light gases and the heavier hydrocarbons which are to be separated from one another. USP 3,206,395 discloses a hydrodesulfurization process wherein effluent from the desulfurization process is stripped so as to remove light gases from the heavier portion of the desulfurized product. According to the process of USP 3,206,395, after separating hydrogen from the effluent from the desulfurization reactor in both low and high temperature separators, the liquid portion of the desulfurized reactor effluent is fed to a steam stripper. The liquid effluent is stripped by steam which is added at the bottom of the stripper, and desulfurized stripped product is withdrawn from the bottom of the stripper. Overhead vapors from the stripper are condensed in part so that heat can be removed from the stripper column by returning cold reflux to the top of the column. The uncondensed portion of the overhead from the stripper is a gaseous product including hydrogen, methane, and ethane. A portion of the condensed overhead is withdrawn as an unstabilized gasoline product. The unstabilized gasoline product represents material boiling between the gaseous overhead product and the desulfurized product withdrawn from the bottom of the stripper. No cold feed is added to the top of the stripper and no pumparound is used for the upper part of the stripper.

SUMMARY OF THE INVENTION

According to the present invention, a process is provided for separating light gases from heavier hydrocarbons, which process comprises (a) feeding a first portion of a mixture of the light gases and heavier hydrocarbons at a first temperature to a fractionation column near a midpoint along the length of the column, (b) applying heat to the material in the column near the bottom of the column, (c) feeding a relatively cold second portion of the mixture, having a temperature at least 50° F. below the first temperature, to the column near the top of the column, (d) withdrawing a pumparound stream from an upper portion of the column, cooling the pumparound stream and then returning it to the column, with the withdrawal and return of the pumparound stream being located between the points at which the first and second mixtures are fed to the column, (e) withdrawing light gases from the top of the column, and (f) withdrawing heavier hydrocarbons from the bottom of the column.

The term "light gases" is used in the present specification to mean gases boiling at or below the boiling point of normal butane, such as $H_2S$, $H_2$, methane, ethane, propane and butane. The term "heavier hydrocarbons" is used to mean hydrocarbons boiling from about normal pentane and upward, but the process of the present invention is preferably applied to the separation of heavier hydrocarbons boiling substantially above the light gases which are stripped or fractionated from the heavier hydrocarbons. The process of the present invention is preferably applied to feedstocks comprising relatively light gases as a mixture with heavier hydrocarbons, such as hydrogen, methane, and ethane dissolved in $C_{10}+$hydrocarbons boiling from about 300 or 350° F. and upward to, for example, 600° F. or 700° F. Preferably, the hydrocarbon mixtures which are separated in the distillation process according to the present invention contain less than 5 weight percent intermediate boiling range hydrocarbons such as light naphtha or $C_5$–$C_9$ hydrocarbons. It is still more preferred to apply the process of the present invention to the separation of mixtures containing less than 1 weight percent of the intermediate boiling range hydrocarbons.

The present invention requires feeding a relatively cold portion of the mixture to be separated to the top of the distillation column, withdrawing heat from the upper part of the distillation column using a pumparound system, and feeding a relatively hot portion of the mixture to be separated to the distillation column near the middle of the distillation column. It is strongly preferred in the process of the present invention to use no reflux to the top of the distillation column, i.e., to omit condensing and then refluxing a portion of the overhead withdrawn from the top of the column. Omitting the reflux system for the distillation column is particularly advantageous when there is very little or essentially no intermediate boiling range material, i.e., material boiling between the light gases which are separated from the heavier hydrocarbons. We have found that it is very advantageous to use a pumparound system or circulating reflux system to remove heat at the upper part of the distillation column in combination with the use of a cold feedstream introduced to the top part of the distillation column. With the use of the pumparound to remove heat from the upper part of the distillation column, a relatively small cold feed stream can be used to the top of the distillation column while still obtaining good fractionation in the distillation column and preventing the escape of relatively heavy hydrocarbons from the top of the distillation column. If a pumparound system was not used for the upper part of the distillation column, then a much larger portion of the total feed stream to the distillation column would be required as cold feed to the top of the column. This would in turn reduce the quantity or portion of the feed which can be introduced hot to the middle of the distillation column. As a result, the amount of heat input from the feed to the distillation column would be reduced and a larger reboiler would be necessary in order to provide adequate stripping and to keep the column in heat balance. Thus, by the use of cold feed to the top of the distillation column in conjunction with a pumparound for the upper part of the distillation column, in accordance with the present invention, it is possible to minimize the size of the reboiler to an optimum value as dictated by the particular fractionation requirements depending upon the particular feedstocks. Furthermore, the cold feed in combination with the pumparound system is easier to control than would be an overhead condensation system and conventional reflux system, especially during startup and most especially in those cases where there is little or no intermediate boiling range material.

In the present specification, the term "the top part" of the distillation column is used to mean that part from about the uppermost distillation tray or the uppermost level of the main body of the packing in the stripper or distillation column to the very top of the distillation column. The term "the upper part" of the column is used to mean that portion between the top part of the distillation column and approximately the center portion of the distillation column where a hot portion of the feedstream is introduced to the distillation column. The term "near a midpoint" or "central portion" of the distillation column is used to mean approximately the central one-third of the length of the distillation column, and in any case, is used to mean a portion along the length of the distillation column below the withdrawal point for the pumparound stream.

In the process of the present invention, the feed mixture to be separated is fed to the distillation column in at least two portions with a first portion being preferably fed to a central portion of the distillation column at a relatively high temperature and a second portion being fed to the top part of the distillation column at a relatively low temperature. Preferably, the cold portion is fed to the distillation column at a temperature at least 150° F. below the temperature at which the relatively hot portion is fed to the distillation column and more preferably, at a temperature at least 250° F. below the relatively hot temperature. Preferably, the first portion is heated before being fed to the central portion of the distillation column by heat exchange with bottoms removed from the distillation column.

The process of the present invention is preferably used in combination with hydroconversion processes wherein hydrocarbon feedstocks are reacted over a hydrogenation catalyst in the presence of hydrogen. Particularly, it is desirable to use the process of the present invention where it is desired to fractionate or strip relatively light gases from heavier liquids, particularly from heavier hydrocarbons.

The process of the present invention is particularly preferred for use in combination wth a jet fuel hydrogenation process. Thus, according to a preferred embodiment of the present invention, a distillation process is provided for use in combination with the production of jet fuel wherein at least a portion of the aromatics in a jet fuel boiling range hydrocarbon feedstock is hydrogenated in a reaction zone by contacting the feedstock, at a temperature between 500° F. and 750° F. and in the presence of hydrogen gas, with a catalyst comprising platinum on alumina and wherein the effluent from the reaction is passed to a separator wherein a hydrogen-rich gas is separated, which distillation process comprises: (a) feeding a first portion of a liquid effluent from the separator to a fractionation column near a midpoint along the length of the column and fractionating light gases dissolved in the liquid feed upward in the column and fractionating jet fuel boiling range hydrocarbons downward in the column, (b) withdrawing a stripped jet fuel product from the bottom of the column at a temperature between about 400 and 650° F. and heat-exchanging the stripped jet fuel product with the first portion of the liquid feed from the separator so as to increase the temperature of the first portion from a temperature between about 50° F. and 150° F. to a temperature between about 350° F. and 600° F. before the first portion is fed to the column, (c) feeding a relatively cold (having a temperature between 50° F. and 150° F.) second portion of the liquid withdrawn from the separator to the column near the top of the column, (d) withdrawing a pumparound stream from an upper portion of the column, cooling the pumparound stream and then returning it to the column, with the withdrawal and return of the pumparound stream being located between the points at which the first and second portions of the liquid from the separator are fed to the column, and (e) withdrawing light gases at a temperature between about 70° F. and 170° F. from the top of the column.

Jet fuel boiling range hydrocarbons which are hydrogenated under relatively mild conditions, including hydrogenation temperatures between about 500° F. and 750° F., usually have a relatively small amount of light naphtha boiling range hydrocarbons because there is very little hydrocracking which occurs during the mild hydrogenation reaction. However, after separating recycle hydrogen from the hydrogenated jet fuel boiling range hydrocarbons, a significant amount of hydrogen remains dissolved in the hydrogenated jet fuel boiling range hydrocarbons. Also, in many instances, it is preferred to use as feed hydrogen gas to the hydrogenation process a hydrogen gas stream containing light hydrocarbons such as methane, ethane and propane, such as hydrogen-rich gas obtained from a catalytic reforming process. The light hydrocarbon present in such hydrogen-rich gases will dissolve or go into liquid mixture with the jet fuel boiling range hydrocarbons separated from the recycle hydrogen following the hydrogenation reaction. The process of the present invention provides a particularly advantageous fractionation means for separating light hydrocarbons such as methane, ethane and propane from jet fuel boiling range hydrocarbons withdrawn from a hydrogenation process. Thus, the distillation process according to the present invention is advantageously applied in combination with hydrogenation of jet fuel boiling range hydrocarbons wherein the hydrogen gas used to hydrogenate the jet fuel boiling range hydrocarbons contains in the range of 3 to 25 volume percent light hydrocarbons such as methane, ethane and propane. Thus, the use of the distillation process described herein in combination with jet fuel hydrogenation is an important aspect, inventive embodiment, or overall process according to the present invention.

The process of the present invention is also advantageously applied to hydrodesulfurization processes carried out under relatively mild conditions such that the liquid effluent from the hydrodesulfurization process contains minor amounts of light hydrocarbons but very low amounts of intermediate hydrocarbons boiling between the main hydrodesulfurized hydrocarbon product and the light hydrocarbons which are to be stripped from the hydrodesulfurized hydrocarbon product. Thus, the process of the present invention is particularly advantageously used in combination with hydrodesulfurization of fuel oil boiling range hydrocarbons as, for example, hydrocarbons boiling within the range of about 500° F. to 1,000° F.

BRIEF DESCRIPTION OF THE DRAWING

The drawing is a schematic process flow diagram indicating a preferred embodiment of the process of the present invention.

DETAILED DESCRIPTION

Referring now more particularly to the drawing, a hydrocarbon feed is introduced to hydroconversion zone 5 via line 1. The hydrocarbon feed is contacted with a hydrogen-rich gas introduced to hydroconversion zone 5 via line 4. To make up for hydrogen consumed in zone 5, a make-up stream of hydrogen is brought into the process via line 2. Most of the hydrogen which is not reacted with the hydrocarbons in hydroconversion zone 5 is separated from the effluent from the hydroconversion zone in separator 7 and recycled via line 3.

The hydroconversion reaction carried out in zone 5 can be a variety of hydroconversion-type reactions including hydrocracking and hydrotreating. The distillation process of the present invention is preferably use in combination with jet fuel hydrogenation or hydrodesulfurization processes. The reaction conditions employed in the hydroconversion zone will, of course, vary with the particular hydroconversion reaction carried out in zone 5 but usually in the process of the present invention, relatively mild temperatures are preferred for the hydroconversion reaction, such as temperatures below 800° F. or below 750° F., so as to minimize the cracking reactions which occur in hydroconversion zone 5. Alternately phrased, the present invention is most advantageously employed in combination with hydroconversion processes wherein there is little cracking in the hydroconversion zone. This is because the distillation method of the present invention is most advantageously applied to hydrocarbon feedstocks containing light gases and heavier hydrocarbons but with little or essentially no hydrocarbons boiling between the light gases and the heavier hydrocarbons which are to be separated.

The hydroconversion zone is usually operated at an elevated pressure, generally in excess of 500 p.s.i.g. and usually between about 1000 and 3000 p.s.i.g. The high pressure effluent from the hydroconversion zone is withdrawn via line 6, cooled in exchanger 9 and then introduced via line 10 to separator 7. In separator 7, recycle hydrogen-rich gas is separated from liquid hydrocarbons. The hydrogen is recycled via line 3 and the liquid hydrocarbons are withdrawn from the separator via line 8. The liquid hydrocarbons can be expanded in an expansion turbine so as to recover power from the pressurized liquid hydrocarbons. A portion of the cool liquid hydrocarbons is fed via line 11 to the top part of stripper 15. Another portion of the liquid hydrocarbons is heat-exchanged with hot bottoms from stripper 15 and introduced as a hot feed (usually at a temperature between about 200° F. and 600° F.) via line 14 to the central portion of stripper 15.

Stripper 15 operates basically in accordance with conventional fractionation or distillation principles using bubble cap trays or sieve trays or packing or other contact means to aid in effecting the fractionation of the liquid hydrocarbon stream withdrawn via line 8 from separator 7. Heat is obtained for the distillation process via reboiler 16 which, in this instance, is a furnace, although other heat input means could be used. A portion of the bottoms from the stripper is withdrawn via line 17 and is heated in furnace 16 and then reintroduced to the lower part of the distillation column via line 18 to supply the heat to generate upward flowing vapors in the stripper. Light gases which are present in the feed to the stripper introduced via line 14 are vaporized and travel upward in the stripper. The jet fuel boiling range hydrocarbons are fractionated downwards in the stripper to thereby aid in generating downward flowing internal reflux for the distillation column. The pumparound system as indicated by lines 19 and 21 is used to remove heat from the upper part of the stripper. In the pump-around circuit, liquid hydrocarbons are withdrawn via line 19 and then cooled in fin fan heat exchanger 20 and returned to the column via line 21.

The cooled portion of the feed to the distillation column which is introduced via line 11 travels downward and because of its relatively low temperature, aids in generating internal reflux to prevent valuable heavier hydrocarbons from leaving the column with the light gases which are removed from the stripper column at the top via line 22.

Although the cold portion of the feed introduced to the top of the column via line 11 prevents valuable heavier hydrocarbons from leaving the column, the high temperatures prevailing at the bottom of the column due to heat input by reboiler 16 drive lighter gases out of the heavier hydrocarbons which are to be removed from stripper 15 via line 23. The high temperatures prevailing in the lower part of stripper 15 prevent light gases from leaving with the heavier hydrocarbons withdrawn via line 23 and force the light gases upwards in the stripper so that they are eventually fractionated out via line 22.

Calculated performance for the process of the present invention in combination with a jet fuel hydrogenation process is as follows. Jet fuel boiling range hydrocarbons are introduced via line 1 to a hydrogenator in zone 5. The term "jet fuel boiling range hydrocarbons" is used in the present specification to mean hydrocarbons boiling within the range of about 300° F. to 600° F. The jet fuel boiling range hydrocarbons are fed in an amount of about 220,000 lbs. per hour and at a temperature of about 560° F. The gravity of the feed is about 37° API. The feed hydrocarbons are combined with about 13 million s.c.f. per day of hydrogen-rich gas fed to zone 5 via line 4. Make-up hydrogen-rich gas introduced via line 2 is about 88 mol percent hydrogen with the balance being mainly methane, ethane and propane. The jet fuel boiling range hydrocarbons are hydrogenated in zone 5 at a pressure of about 1600 p.s.i.g. by contacting the hydrocarbon feedstock at a temperature between about 560° F. and 660° F. and in the presence of the hydrogen gas with a catalyst comprising two-tenths weight percent platinum on alumina.

The effluent is withdrawn from the hydrogenation reactor via line 6 and is cooled in exchanger 9 to a temperature of about 90° F. Recycle hydrogen is separated from the cooled high pressure effluent in separator 7. The hydrogen is recycled via line 3 and the high pressure liquid effluent is withdrawn from separator 7 at a temperature of about 90° F. and a pressure of about 1550 p.s.i.g. The gravity of the liquid hydrocarbons withdrawn via line 8 is about 45.3° API and the flow rate is about 228,000 lbs. per hour.

After recovering power from the high pressure liquid by expanding the high pressure liquid, approximately 30,000 lbs. per hour of the liquid is fed via line 11 at a temperature of 90° F. to the top of the distillation column. The remainder of the liquid effluent, i.e., about 198,000 lbs. per hour, is passed via line 12 to exchanger 13 for heat exchange with hot bottoms removed via line 23 from stripper 15. The hot bottoms heat the liquid effluent from about 90° F. to about 520° F. and 27 weight percent vaporization. The hot feed comprising the major portion of the effluent from the hydrogenation process is introduced to the central portion of stripper 15 at tray 8, the top tray being tray 15.

Stripper 15 is operated at a bottoms pressure of about 65 p.s.i.g. and a bottoms temperature of about 550° F. The pumparound system withdrawal in line 19 is taken off from tray 9 at a temperature of about 460° F. and after removing heat via exchanger 20, the pumparound liquid is returned to the stripper at tray 11 at a temperature of about 200° F. Light gases composed primarily of hydrogen, methane, ethane, and propane are withdrawn at a temperature of about 110° F. via line 22 from the top of the distillation column. Preferably, a demister pad or other device is used at the top of the column to knock down mainly entrained liquid which may tend to leave with the gases leaving from the upper part of the column. Bottoms are removed from the column at a temperature of about 550° F. and then exchanged in exchanger 13 with the main portion of the feed to the distillation column to reduce the bottoms temperature in line 23 to about 160° F. Approximately 223,000 lbs. per hour of jet fuel product are withdrawn via line 23 and the gravity of the product is about 39° API.

In operation, the process of the present invention was found to give particularly satisfactory results. Even at low pumparound loading (and thus low internal reflux at the upper part of the column) the process of the present invention resulted in good fractionation of light gases from jet fuel boiling range hydrogenated hydrocarbons with essentially no loss of jet fuel boiling range hydrocarbons in the overhead light gases stripped from the jet fuel boiling range hydrocarbons. Approximately 135,000 lbs. per hour of hot feed was fed to the column at a temperature of about 470° F. and approximately 23,000 lbs. per hour was fed to the column via line 11 at a temperature of 65° F. The pumparound was operated at these reduced rates at a withdrawal temperature of about 416° F. and a return temperature of about 107° F. The cooling duty of pumparound cooler 20 was only 1.5 million b.t.u. per hour versus a design duty of 3.4 million B.t.u. per hour. The reboiler was operated at an inlet temperature of about 527° F. and a return temperature via line 18 of about 550° F. with 30 percent vaporization. The overhead withdrawn from the column was about .7 million s.c.f. per day of gas at a temperature of about 130° F. This overhead temperature was low enough to limit the loss of valuable heavier boiling products to an acceptable level. A lower overhead temperature, and hence even less loss of heavy boiling products, could have been accomplished by using a higher pumparound rate. About 156,300 lbs. per hour of bottoms was withdrawn via line 23. The gravity of the bottoms product was approximately 42.5° API, indicating very little light ends left in the bottoms product.

Although various embodiments of the invention have been described, it is to be understood that they are meant to be illustrative only and not limiting. Certain features may be changed. It is apparent that the present invention has broad application to the removal of light gases from heavier hydrocarbons using a distillation column with hot feed to a central portion of the distillation column, a cold portion of the feed to the top part of the distillation column and with a pumparound system for the distillation column located between the two feed points. Accordingly, the invention is not to be construed as limited to the specific embodiments or examples discussed but only as defined in the appended claims.

I claim:

1. A process for separating light gases from heavier hydrocarbons which comprises:
   (a) feeding a first portion of a mixture of the light gases and heavier hydrocarbons at a first temperature to a fractionation column near a midpoint along the length of the column,
   (b) applying heat to the material in the column near the bottom of the column,
   (c) feeding a relatively cold second portion of the mixture, having a temperature at least 50° F. below the first temperature, to the column near the top of the column,
   (d) withdrawing a pumparound stream from an upper portion of the column, cooling the pumparound stream and then returning it to the column, with the withdrawal and return of the pumparound stream being located between the points at which the first and second mixtures are fed to the column,
   (e) withdrawing light gases from the top of the column, and
   (f) withdrawing heavier hydrocarbons from the bottom of the column.

2. A process in accordance with claim 1 wherein the light gases comprise hydrogen, methane and ethane, the heavier hydrocarbons comprise $C_{10}+$ hydrocarbons and there is less than five weight percent $C_5$ through $C_9$ hydrocarbons in the mixture.

3. A process in accordance with claim 1 wherein there is less than 1 weight percent $C_5$ to $C_9$ hydrocarbons in the mixture.

4. A process in accordance with claim 1 wherein the cold second portion of the mixture is fed to the column at a temperature for the second portion at least 250° F. below the first temperature.

5. A process in accordance with claim 1 wherein the mixture from which the first and second portions are obtained is at least a portion of the effluent from a jet fuel hydrogenation process.

6. A distillation process, for use in combination with the production of jet fuel wherein at least a portion of the aromatics in a jet fuel boiling range hydrocarbon feedstock is hydrogenated in a reaction zone by contacting the feedstocks, at a temperature between 500° F. and 750° F. and in the presence of hydrogen gas, with a catalyst comprising platinum on alumina and wherein the effluent from the reaction is passed to a separator wherein a hydrogen-rich gas is separated, which comprises:
   (a) feeding a first portion of a liquid effluent from the separator to a fractionation column near a mid-point along the length of the column and fractionating light gases dissolved in the liquid feed upward in the column and fractionating jet fuel boiling range hydrocarbons downward in the column,
   (b) withdrawing a stripped jet fuel product from the bottom of the column at a temperature between about 400° F. and 650° F. and heat-exchanging the stripped jet fuel product with the first portion of the liquid feed from the separator so as to increase the temperature of the first portion from a temperature between about 50° F. and 150° F. to a temperature between about 350° F. and 600° F. before the first portion is fed to the column,
   (c) feeding a relatively cold second portion of the liquid withdrawn from the separator having a temperature between about 50° F. and 150° F. to the column near the top of the column,
   (d) withdrawing a pumparound stream from an upper portion of the column, cooling the pumparound stream and then returning it to the column, with the withdrawal and return of the pumparound stream being located between the points at which the first and second portions of the liquid from the separator are fed to the column, and
   (e) withdrawing light gases at a temperature between about 70° F. and 170° F. from the top of the column.

7. A process in accordance with claim 6 wherein the light gases comprise hydrogen, methane and ethane, the heavier hydrocarbons comprise $C_{10}+$ hydrocarbons and there is less than five weight percent $C_5$ through $C_9$ hydrocarbons in the mixture.

8. A process in accordance with claim 6 wherein at least a portion of the hydrogen gas used to hydrogenate the jet fuel boiling range hydrocarbons contains at least five volume percent light hydrocarbons comprising methane, ethane and propane.

9. A process in accordance with claim 1 wherein the first portion and the second portion of the mixture of light gases and heavier hydrocarbons are derived from at least a portion of the effluent of a hydrodesulfurization process.

10. A process in accordance with claim 9 wherein the light gases comprise hydrogen, methane and ethane, the heavier hydrocarbons comprise $C_{10}+$ hydrocarbons and there is less than five weight percent $C_5$ through $C_9$ hydrocarbons in the mixture.

11. A process in accordance with claim 9 wherein the hydrodesulfurization process is a fuel oil desulfurization process.

References Cited
UNITED STATES PATENTS

| | | | |
|---|---|---|---|
| 3,384,577 | 5/1968 | Shaffer et al. | 208—351 |
| 2,301,304 | 11/1942 | Maxwell et al. | 208—351 |
| 3,383,308 | 5/1968 | Wickham et al, | 208—358 |
| 2,880,166 | 3/1959 | Wilson | 208—100 |
| 2,871,275 | 1/1959 | Gerhold | 208—351 |
| 3,320,159 | 5/1967 | Potts | 208—358 |

HERBERT LEVINE, Primary Examiner

U.S. Cl. X.R.

208—351, 358